United States Patent [19]

Ueda et al.

[11] 3,999,016
[45] Dec. 21, 1976

[54] AUTOMATIC TELEPHONE ANSWERING AND MESSAGE RECORDING APPARATUS

[75] Inventors: Tateki Ueda; Terumasa Shimizu; Shinichi Oguma, all of Tokyo, Japan

[73] Assignee: Pioneer Electronic Corporation, Tokyo, Japan

[22] Filed: Sept. 13, 1974

[21] Appl. No.: 505,694

[30] Foreign Application Priority Data

Sept. 14, 1973 Japan ............... 48-107018[U]

[52] U.S. Cl. .................................................. 179/6 E
[51] Int. Cl.² ........................................... H04M 1/64
[58] Field of Search ............. 179/6 E, 6 R, 6 AC

[56] References Cited

UNITED STATES PATENTS

| | | | |
|---|---|---|---|
| 2,816,167 | 12/1957 | Müller et al. ............... | 179/6 E |
| 3,337,690 | 8/1967 | Martin ........................ | 179/6 E |
| 3,383,469 | 5/1968 | Goodman .................... | 179/6 E |
| 3,508,004 | 4/1970 | Waldman ..................... | 179/6 E |
| 3,894,188 | 7/1975 | Konno ......................... | 179/6 E |
| 3,903,369 | 9/1975 | Darwood ..................... | 179/6 E |

*Primary Examiner*—Raymond F. Cardillo, Jr.
*Attorney, Agent, or Firm*—Sughrue, Rothwell, Mion, Zinn & Macpeak

[57] ABSTRACT

A remote control signal for initiating playback of a previously recorded message tape in an automatic telephone answering apparatus is recorded on the message tape after the recorded messages. The remote control signal causes the tape to be rewound, and the tape position is monitored by a tape counter. The counter is reset to zero at a tape position near the beginning of the rewind operation, but just after the tape portion carrying the remote control signal is rewound and before the message-bearing tape portion is rewound. After the tape is completely rewound, its direction is reversed for reproducing and playing back the recorded message. When the counter counts down to zero during playback, playback is stopped and the apparatus is ready for recording new messages over the previously recorded remote control signal, thereby erasing the signal and permitting the newly-recorded messages to be played back upon receipt of another remote control signal.

4 Claims, 3 Drawing Figures

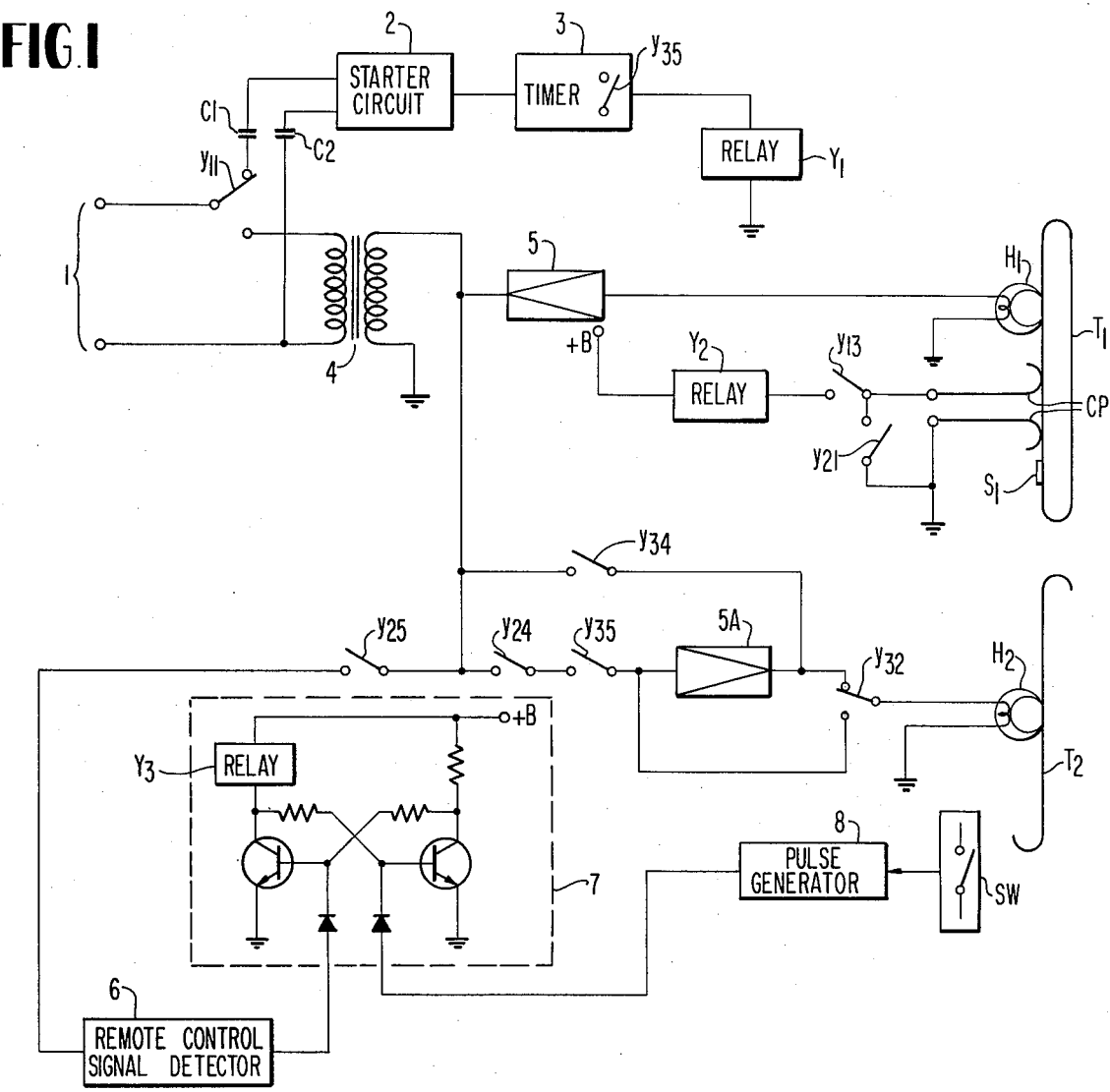
FIG.1
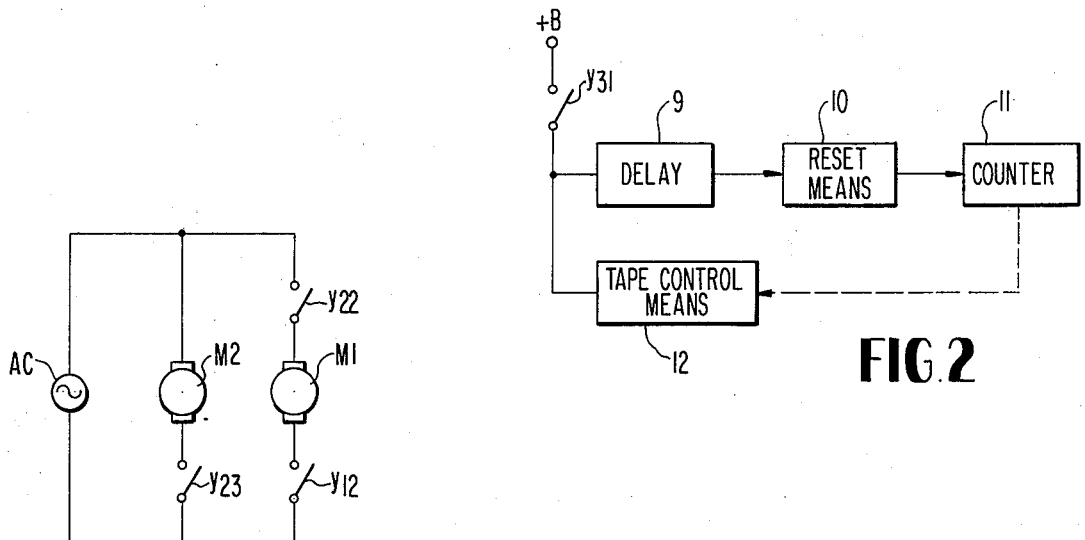
FIG.2
FIG.3

AUTOMATIC TELEPHONE ANSWERING AND MESSAGE RECORDING APPARATUS

BACKGROUND OF THE INVENTION

1. Field of the Invention

This invention relates to the field of automatic telephone answering apparatus and, more particularly, to an automatic telephone answering and message recording apparatus provided with a remote control mechanism controlled by a remote control operation through a telephone line to reproduce messages left by calling subscribers and recorded on a tape in the apparatus.

2. Description of the Prior Art

During the period when messages left by calling subscribers are being reproduced by a remote control operation through a telephone line, the apparatus must be kept in a busy condition. To maintain this "busy" condition, there is a well-known method wherein the apparatus is reset to a non-busy condition when the previously recorded remote control signal is reproduced upon playback of the recorded messages. In such a method, the remote control signal from the calling owner of the apparatus is recorded, and at the same time it is detected by a remote control signal detector, and then several seconds (approximately 5 seconds) later, the magnetic tape is rewound. After the rewinding operation is finished, the reproducting operaton begins automatically to send the messages left by calling subscribers to the apparatus' owner who initiated the playback operation by sending the remote control signal over the telephone line. When the remote control signal is reproduced after the reproduction of the recorded messages, the apparatus stops and returns to its stand-by or non-busy condition. Therefore, following incoming messages from calling subscribers are recorded on the message tape after the remote control signal. Accordingly, although the messages recorded over the tape range from its initaial position up to the remote control signal are always reproduceable, the messages recorded later than the once-reproduced portion; i.e., after the remote control signal cannot be reproduced by a remote control operation, since the apparatus will again be reset to its initial position as soon as it detects the previously recorded remote control signal. Therefore, succeeding remote control operations can be used only for playing back the same tape portion reproduced for the first playback operation. In addition, second or later remote control operations may result in the erasure of messages recorded later than the remote control signal recorded at the time of the first remote control operation, because those messages are continually replaced by new messages left by other subscribers.

There is an improved prior art apparatus in which the tape portion carrying the recorded remote control signal is automatically rewound when the remote control signal is reproduced after the reproduction of the messages to be heard by the calling owner, and the recording of a new incoming message from a calling subscriber is begun at the rewound position. In other words, the erasure of the remote control signal will permit the owner of the apparatus to listen to all subsequently recorded incoming messages from calling subscribers in the second and later remote control operations. In such apparatus, however, the tape portion where a remote control signal is recorded must be rewound immediately after the reproduction thereof, and, consequently, some additional means must be provided, thereby making the entire construction of the apparatus large and complex. Furthermore, means must be provided for recognizing the remote control signal in the midst of a reproducing operation. Such a means must discriminate between the remote control signal and other voice signals, and is complex and expensive, and may be a cause of erroneous operation of the apparatus.

SUMMARY OF THE INVENTION

According to the present invention, the above-mentioned problems are solved by providing an automatic telephone message recording apparatus which is greatly simplified in construction, as compared with conventional ones, and which provides a reliable and accurate remote control operation due to the utilization of relays and a counter-actuated contact for erasing each recorded remote control signal after playback of the recorded messages.

BRIEF DESCRIPTION OF THE DRAWING

FIG. 1 is a block diagram for showing the outline

FIG. 2 is a block diagram of the part to be operated in cooperation with the part shown in FIG. 1.

FIG. 3 is a block diagram of driving circuit.

DETAILED DESCRIPTION OF THE PREFERRED EMBODIMENT

A pair of junction terminals 1 are adapted to be connected to a pair of telephone lines (not shown). An actuating or starter circuit 2 rectifies and stores the incoming ringing signal applied to the junction terminals 1, thereby activating a timer 3 in three to ten seconds. Timer 3 is actuated by an output of starter circuit 2 so as to determine the whole operation period of the preferred automatic telephone message recording apparatus. In addition, timer 3 is temporarily interrupted in its timing cycle during the time period when relay Y3 is energized and its contact $y35$ is closed, and hence the timing cycle or operation period of the timer is extended by the length of the interruption caused by the closure of the contact $y35$.

A relay Y1 having three contacts $y11$, $y12$ and 713 is excited by an output of timer 3. A matching transformer 4 is adapted to be connected to ther terminals 1 through contact $y11$ or relay Y1. An amplifier 5 is connected to the secondary winding of matching transformer 4 to amplify a reproduced signal. An answer tape T1 carries answer message words which have been previously recorded and, in the present embodiment, it is an endless tape. A pair of contact pieces CP detect the conductive leaf S1 adhered to the answer tape T1. A relay Y2 has four contacts $y21$, $y22$, $y24$ which operate when contact pieces CP are short-circuited by contact with conductive leaf of answer tape T1. An amplifier 5A amplifies the message signal from a calling subscriber, or the signal from magnetic head H2 when relay Y3 operates to switch over contacts $y32$ and $y33$.

A remote control signal detector 6 is adapted to be connected to the secondary winding of matching transformer 4 via contact $y25$ of relay Y2 to produce an output at the time of remote control signal, different from an ordinary message signal is received at the line terminals 1. The output from the remote control signal detector turns on a flip-flop circuit 7 to actuate relay Y3, and thenceforth circuit 7 remains "on" for an interval, until it is turned off by the signal supplied by a pulse generator 8. During this interval, Y3 continues to operate. Pulse generator 8 generates a pulse signal when switch SW of a tape position counter 11 is closed.

In FIG. 2, delay circuit 9 starts to operate when the contact y31 of the relay Y3 is closed, and produces an output after a predetermined time duration; for example, one to three seconds. A reset means 10, such as a plunger, operates in response to the output from delay circuit 9 to reset counter 11 to its "zero" position thereby closing switch SW.

A message recording tape T2 is for recording messaages transmitted by calling parties. A control means 12 controls the rewinding of recording tape T2 when contact y31 of relay Y3 is closed, the start of the tape reproducing operation just after the end of the rewinding operation, and the stop of the rewinding operation in response to the closure of contact SW of counter 11 in order to prepare for the next recording. The counter-operated switch SW and the relay Y3 are shown in more detail in pending application Ser. No 247,648 filed Jan. 16, 1974, and assigned to the assignee of the present application.

In FIG. 3, an A.C. power source is provided for energizing a driving motor M1 for answering tape T1, and a driving motor M2 for message recording tape T2.

Referring to the circuit diagram described hereinbefore, the sequence of operation will be now set forth as follows: A calling signal, or so-called ringing signal, incoming to the pair of junction terminals 1 connected to a pair of telephone lines, is applied to starter circuit 2 through contact y11 and coupling condensers C1 and C2.

The starter circuit 2 produces its output at a time three to ten seconds later than the arrival of the first ringing signal. This output actuates timer 3, which provides an output for a predetermined period. The output of timer 3 energizes relay Y1, so that its contacts y11, y12 and y13 are switched over to the opposite sides of those shown in the drawing. The change in position of contact y11 connects the telephone line to matching transformer 4. Thus, a communication circuit is established, and a series of answer message words are transmitted to the calling party. After giving to the calling party the information that he can leave a message, the endless answering tape T1 continues to be driven so that the tape travels approximately one cycle before the conductive leaf S1 appears and short-circuits the contact pieces CP. As the contact y13 is now in the closed position, relay Y2 is energized and closes contacts y21, y22, . . . , y25. Closure of contact y21 keeps relay Y2 operating after contact pieces CP are opened. Release of contact y13 disables relay Y2, so that motor M2 stops, and the recording operation comes to an end. The switch-over of contact y11 open-circuits the communication path of the telephone line and puts the answering apparatus in a stand-by condition, whereby all operations come to an end.

However, let us now consider the condition wherein the answering operation is completed and relay Y2 is still operated, but a remote control signal transmitted by a calling party (the owner of the apparatus) is recorded on the message recording tape. Since contact y25 is closed, the signal is also delivered to remote control signal detector 6. The detector will recognize the remote control signal if the signal continues for a certain time period (about five seconds), and transmits a signal, which turns "on" flip-flop circuit 7, which in turn energizes relay Y3. Consequently, contacts y31, y32, y33, y34 and y35 are switched over. Closure of contact y31 actuates control means 12, so that it operates to rewind message recording tape T2. On the other hand, after a given time period (long enough to rewind the tape portion on which the remote control signal has just been recorded) determined by the time delay of delay circuit 9, a signal is supplied to reset means 10 which resets counter 11 to "zero" (home position). Even after the reset of counter 11, message recording tape T2 continues to be rewound. Therefore, the counter counts in the opposite direction so as to effectively indicate the tape position at which the counter reset occurred, the contact SW being open.

At the time message recording tape T2 is completely rewound, control means 12 starts the play-back operation, and counter 11 begins counting in the forward direction. The reproduced signal is transmitted through magnetic head H2, contact y32, amplifier 5A, contact y34, matching transformer 4, and contact y11, back to the calling party. After the reproduction of the messages is finished and at the moment when counter 11 advances to "zero", contact SW closes again, and causes a signal to be sent from pulse generator 8 to flip-flop circuit 7. This signal resets flip-flop circuit 7, and hence releases relay Y3. Thus, the apparatus is ready for recording a message. This message recording period is determined by timer 3, operation of which has been temporarily interrupted by switch-over of contact y35 while relay Y3 was operated. After the time period determined by timer 3 has passed, the apparatus is put in the stand-by or non-busy condition by the same operation as described above.

Of course, the tape position prepared for message recording is located prior to the position on which the remote control signal is recorded, so that new incoming messages will be recorded over the previously recorded remote control signal, thereby erasing the remote control signal.

As described hereinabove, according to this invention, the present apparatus is so constructed that the message recording tape is rewound in response to an incoming remote control signal, the tape counter being reset to "zero" after a given delay time sufficient to rewind the tape portion carrying the recorded remote control signal, and then the reproducting operation is stopped when the counter becomes "zero" during play-back of the tape. Therefore, the construction is simple, and operation is secure, when compared with those of conventional prior art apparatus. In addition, wasteful use of tape is avoided, because the remote control signal is erased, and in its place a new message is recorded.

We claim:

1. In a remote signal-controlled automatic telephone answering and recording apparatus of the type including: an answer tape; a message recording tape; means responsive to an incoming calling signal for playing back the answer tape to the calling party and for recording the calling party's message on the message tape; and means responsive to a received remote control signal from a calling party for recording the signal on the message tape, rewinding the message tape and playing back the message tape over a telephone line to the calling party; the improvement comprising:

a. means for storing a position of the message tape during rewinding, said position being located between the beginning of the recorded remote control signal and the end of the last of the recorded messages; and b. circuit means responsive to the message tape's returning to the stored position during playback of the message tape for stopping the message tape at the stored position, whereby new incoming messages are recorded on the message tape beginning at the stored position so that the remote control signal is erased from the message tape to permit the new messages to be played back in response to a subsequent remote control signal.

2. The improvement as defined in claim 1 wherein said apparatus further includes timer means responsive to said incoming signal for defining a predetermined time period during which said apparatus is connected to said telephone line in a busy state, and wherein said circuit means further comprises means for extending said time period to accommodate the playback of the message tape.

3. The improvement as defined in claim 1 wherein said storing means comprises a reversible tape position counter which counts in one direction during rewinding of the message tape and in the opposite direction during playback thereof, and said circuit means further comprises delay means for resetting the counter to a count of zero during rewinding when the message tape reaches said stored position, and switch means responsive to a count of zero when said counter is counting in said opposite direction during playback of the message tape to stop said message tape at said position.

4. A method of controlling the playback of the message tape in a remote signal-controlled automatic telephone answering device wherein the tape has a message portion for recording incoming messages thereon, and wherein an incoming remote control signal is recorded on the tape following the message portion, comprising the steps of:
  a. detecting the incoming remote control signal to initiate rewinding of the message tape in the reverse direction;
  b. storing, during rewinding of the tape, an indication of a tape position between the end of the last-recorded message and the beginning of the recorded remote-control signal;
  c. playing back the message in the forward direction after the tape is completely rewound; and
  d. stopping the playback operation when the tape reaches the stored position so that subsequently received incoming messages will be recorded over the recorded remote-control signal, thereby erasing the remote-control signal and permitting playback of said subsequently recorded messages.

* * * * *